(12) United States Patent
Keshavaraj

(10) Patent No.: US 7,201,397 B2
(45) Date of Patent: Apr. 10, 2007

(54) AIRBAG WITH IRREGULARLY SHAPED PANELS AND SEGMENTS

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 168 days.

(21) Appl. No.: 10/610,201

(22) Filed: Jun. 30, 2003

(65) Prior Publication Data

US 2004/0262902 A1 Dec. 30, 2004

(51) Int. Cl.
*B60R 21/16* (2006.01)

(52) U.S. Cl. ............... 280/743.1; 206/522; 383/37; 383/79; 383/107; 383/120; 280/728.1; 280/731; 493/186; 493/405; 112/475.08

(58) Field of Classification Search ............ 280/728.1, 280/731, 743; 383/37, 79, 107, 120, 902, 383/907; 493/186, 405, 916, 940; 206/522; 428/34.1, 34.5, 34.6; 112/475.08
See application file for complete search history.

(56) References Cited

U.S. PATENT DOCUMENTS

| | | | |
|---|---|---|---|
| 3,864,997 A | 2/1975 | Pearl et al. | |
| 4,210,041 A | 7/1980 | Mitman et al. | |
| 5,146,821 A | 9/1992 | Bruder et al. | |
| 5,533,755 A | 7/1996 | Nelsen et al. | |
| 5,815,398 A | 9/1998 | Dighe et al. | |
| 6,168,203 B1 * | 1/2001 | Amamori | 280/743.1 |
| 6,173,211 B1 | 1/2001 | Williams et al. | |
| 6,315,324 B1 | 11/2001 | Keshavaraj | |
| 6,409,858 B1 | 6/2002 | Popp et al. | |
| 6,494,484 B2 | 12/2002 | Bosgieter et al. | 280/743.1 |
| 2002/0002416 A1 | 1/2002 | Herman | |
| 2002/0043792 A1 | 4/2002 | Keshavaraj | 280/743.1 |
| 2002/0135173 A1 | 9/2002 | Keshavaraj | |
| 2002/0153717 A1 | 10/2002 | Keshavaraj | 280/743.2 |
| 2003/0087056 A1 | 5/2003 | Ducker et al. | |

FOREIGN PATENT DOCUMENTS

EP 0 742 122 A 11/1996

\* cited by examiner

*Primary Examiner*—Arti Singh
(74) *Attorney, Agent, or Firm*—Terry T. Moyer; John E. Vick, Jr.

(57) ABSTRACT

An airbag and a method for making an airbag of the type that includes an irregularly-shaped panel, such as the side panels of a passenger airbag. The irregularly-shaped side panel is first divided into two segments with a single straight line to define an inflation segment and an impact segment. The straight line drawn to define the largest polygon that can be defined by any single straight line without coming too close to the inflation module hole. By segmenting the larger, irregularly shaped panel into two smaller ones with one of those being polygonal, better nesting of the segments can be obtained, which significantly improves fabric utilization to offset the labor cost from sewing the two segments together when making the irregularly shaped side panel required for the airbag.

10 Claims, 3 Drawing Sheets

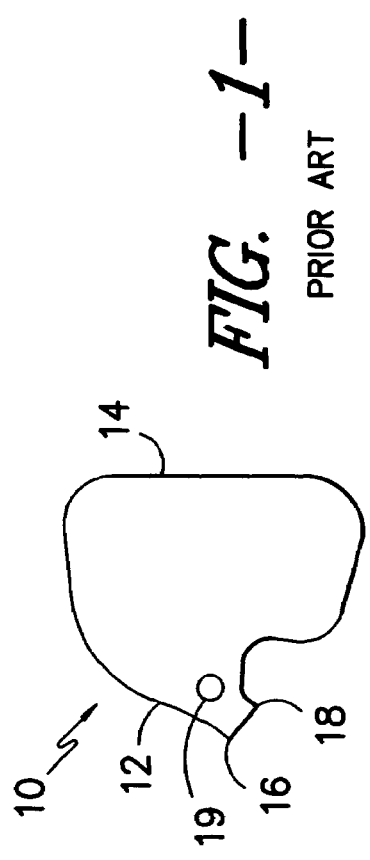
FIG. -1-
PRIOR ART
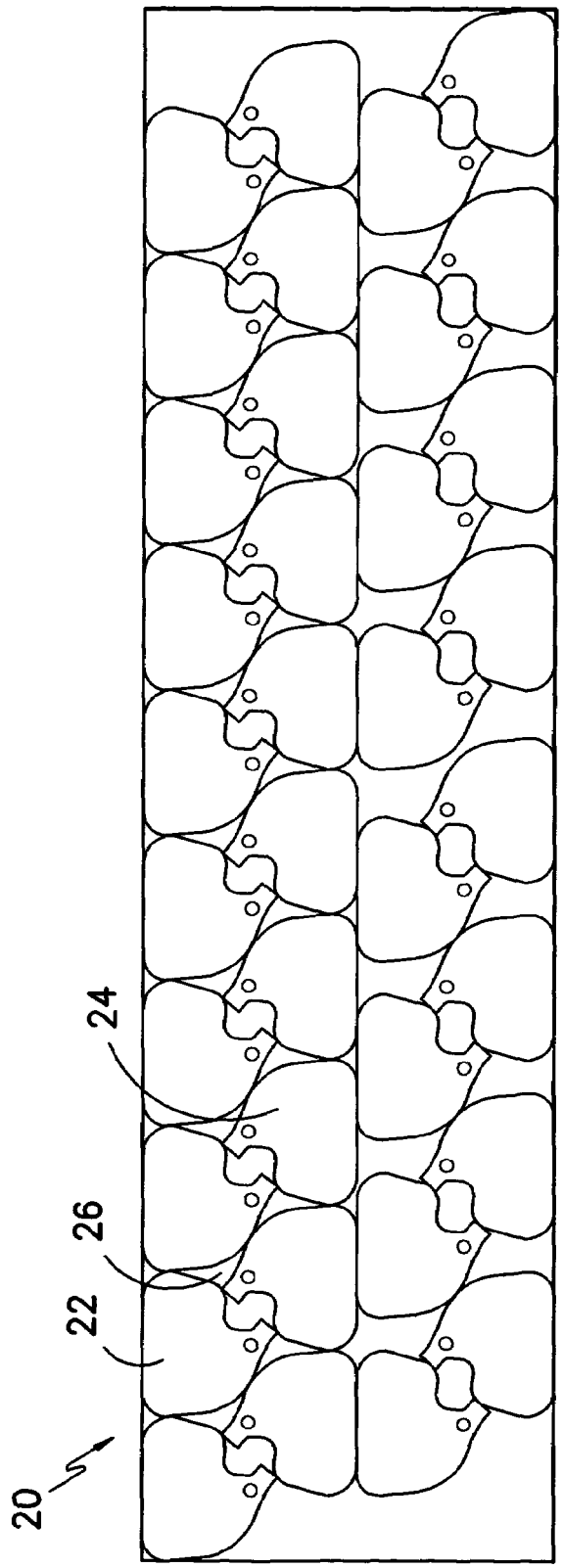
FIG. -2-
PRIOR ART

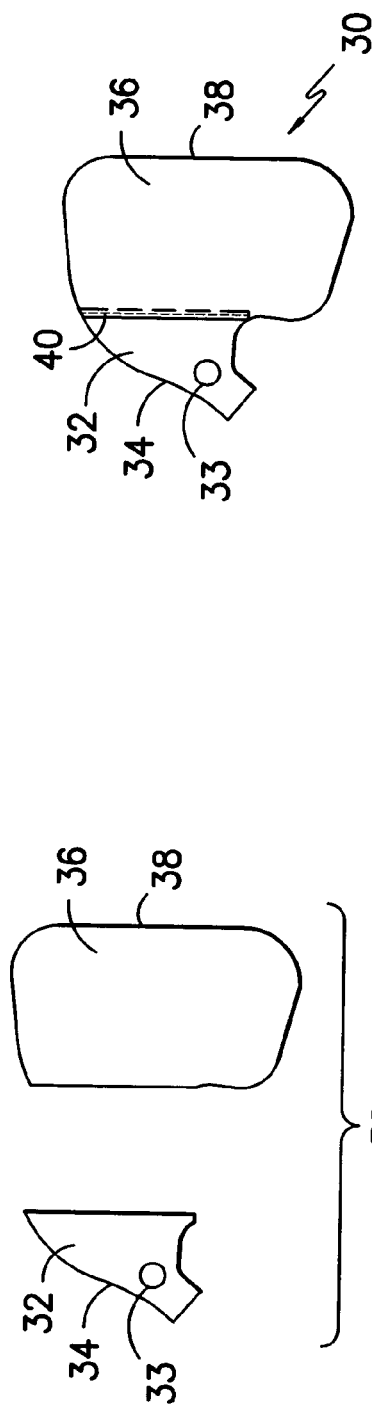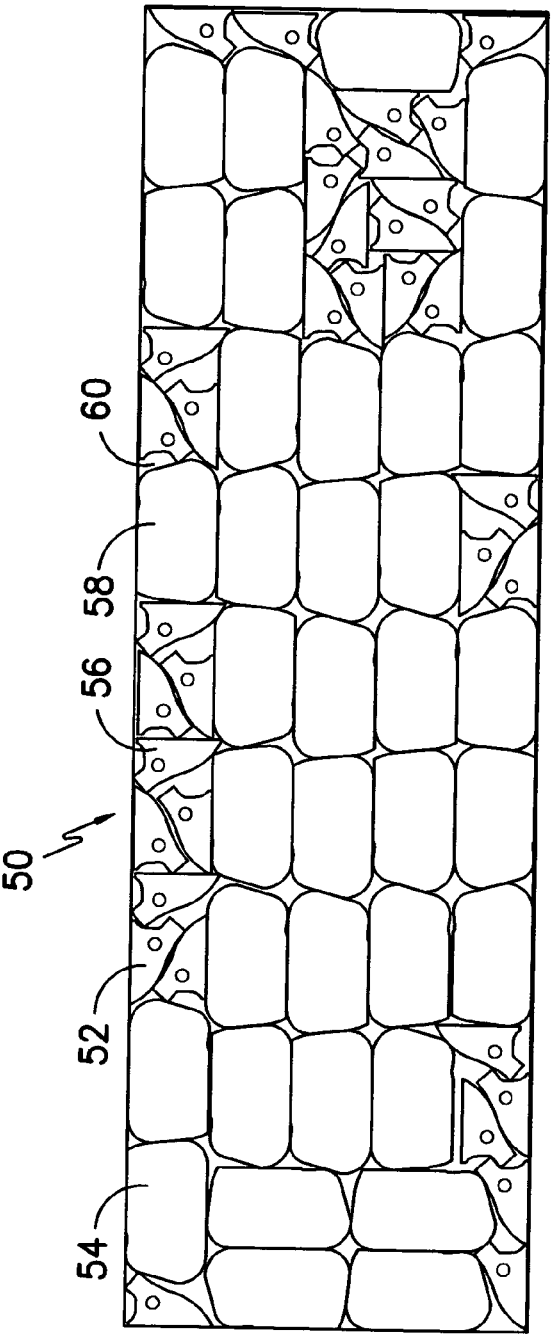

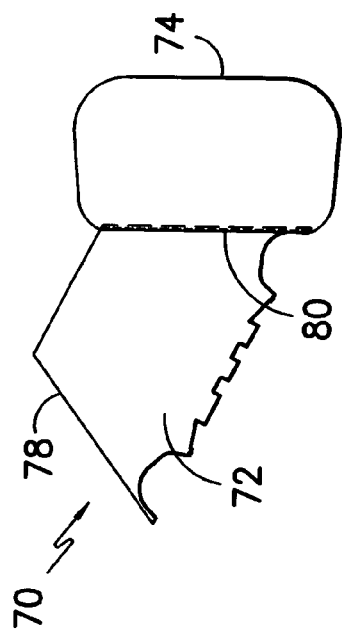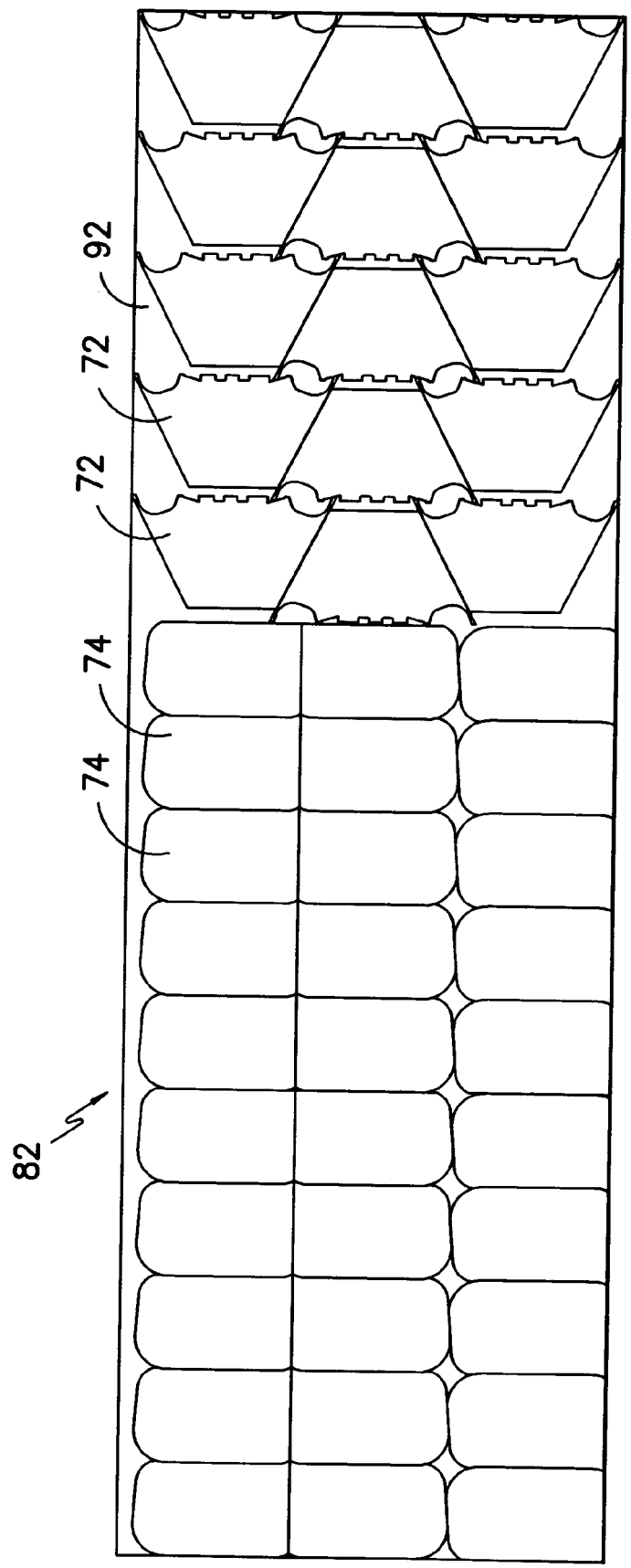
FIG. -6-
FIG. -7-

AIRBAG WITH IRREGULARLY SHAPED PANELS AND SEGMENTS

BACKGROUND OF THE INVENTION

The present invention relates to inflatable protective cushions, and more specifically relates to methods for making irregular panels that are part of a passenger-side airbag.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filling the cushion to a deployed state that can absorb the impact of the movement of a body against it and dissipate its energy by means of rapid venting of the gas. The entire sequence of events occurs within about 100 milliseconds. In the undeployed state, the cushion is most commonly stored in or near the steering column, the dashboard, in a door panel, or in the back of a front seat placing the cushion in close proximity to the person or object it is to protect.

A typical construction material for airbags has been a polyester or nylon fabric, coated with an elastomer such as neoprene, or silicone. The fabric used in such bags is typically a woven fabric formed from synthetic yarn by weaving practices that are well known in the art.

The use of a coating material has found acceptance because it acts as an impermeable barrier to the inflation medium. This inflation medium is generally a nitrogen or helium gas generated from a gas generator or inflator. Such gas is conveyed into the cushion at a relatively warm temperature. The coating obstructs the permeation of the fabric by such gas, thereby permitting the cushion to rapidly inflate without undue decompression during a collision event.

Airbags may also be formed from uncoated fabric that has been woven in a manner that creates a product possessing low permeability or from fabric that has undergone treatment such as calendaring to reduce permeability.

SUMMARY OF THE INVENTION

According to its major aspects and briefly recited, the present invention is an airbag and a method for making an airbag. The method is focused on the minimization of wasted fabric. According to the method of the present invention, two techniques are used to minimize wasted fabric. One of the two techniques is careful nesting of the parts of the airbag on a panel of fabric. Nesting per se is a known technique for reducing waste material. However, the second technique involves the segmentation of the side panels notwithstanding the fact that these segments have to be sewn together to recreate the original side panel in order to make the airbag. By subdividing the side panel into smaller segments, using certain rules set forth herein, a better nesting of these smaller segments can be achieved than would be the case when attempting to nest the whole side panel. Thus, these two techniques combine to improve fabric utilization.

Of course, by dividing a side panel into segments, more seams need to be sewn together to make the inflatable airbag. Sewing adds cost, but, by judicious segmentation of the side panel, the improvements in fabric utilization offset the higher labor costs.

In particular, each side panel is divided into preferably only two segments, preferably a larger one and a smaller one. The smaller one is the end of the side panel that includes the inflation module. The two segments are defined by a straight-line boundary so that at least a portion of the edge of each of the two segments is straight, which allows for better nesting by the use of common borders. The line boundary must not be too near to the inflation hole seam in order to avoid placing the segment seam too close to the inflation hole seam. At least the larger segment should define a polygon, preferably the largest polygon that can be defined in the panel without getting too close to the inflation hole seam and that separates the two segments by a straight line.

The orientation of the larger segment with respect to the orientation of the smaller segment is not critical. Therefore, it can be chosen to facilitate nesting. Generally, nesting is improved if the major dimension of the larger segment is parallel or perpendicular to the orientation of the fabric yarns. In contrast, the orientation of the smaller segment with respect to the fabric is very important and must fall within a relatively narrow range. Thus, the orientation of the fabric for the larger segment can be chosen based on nesting considerations and without regard to whether or not it is different than that of the smaller segment.

The present method increases material utilization and reduces waste that must be disposed of while leaving the resulting airbag largely unchanged. Several features of the present invention combine to increase fabric utilization in the manufacture of airbags. One of these features is that the side panel is formed in two segments that are joined to form one panel. Smaller segments generally nest better than larger ones and thereby make fuller use of fabric. Another feature is that the larger of the two segments can be oriented with respect to the fabric in any desired way, so flexibility in choosing a nesting strategy is significantly increased. Still another feature is that at least the larger of the two segments is chosen to form a polygon rather than a more irregular shape that is harder to nest.

Other features and their advantages will be apparent to those skilled in the art of air bag manufacture from a careful reading of the Detailed Description of Preferred Embodiments, accompanied by the figures.

BRIEF DESCRIPTION OF THE DRAWINGS

In the drawings,

FIG. 1 is an example of a prior art side panel of an airbag;

FIG. 2 is an example of a fabric panel patterned with the side panel of the air bag of FIG. 1, well-nested, according to the prior art;

FIG. 3 is an example of segmentation of a side panel according to a preferred embodiment of the present invention, as applied to the airbag side panel of FIG. 1, according to a preferred embodiment of the present invention;

FIG. 4 is the side panel formed by sewing the two segments illustrated in FIG. 3;

FIG. 5 is an example of a fabric panel with a well-nested pattern of the segments of the side panel of the airbag of FIG. 1;

FIG. 6 is another example of a side panel of an airbag segmented according to a preferred embodiment of the present invention; and FIG. 7 is an example of a fabric panel with a well-nested pattern of the segments of the side panel of the airbag of FIG. 6.

DETAILED DESCRIPTION OF EMBODIMENTS

The present invention is an airbag and a method for making an airbag by trading significant reduction in material costs for slightly higher labor costs. The reduction in material costs is obtained by increased material utilization with a corresponding reduction of waste. The higher labor costs result from segmenting previously unsegmented side panels of airbags and then sewing the woven segments together.

Two examples of the present invention will be described and then the specific steps that comprise the present method will be presented.

The word "panel" will be used herein in different contexts to refer to different objects. An airbag "panel" such as a "side panel" is a portion of the surface of the inflatable structure of an airbag. A "panel" of fabric is a portion of a run of fabric woven on a loom. A panel pattern is an instruction for cutting a panel of fabric to produce airbag panels. A "segment" is used herein to indicate a portion of a side panel of an airbag. A segment pattern is an instruction as to how a segment should be made.

FIG. 1 illustrates a side panel 10 of a typical passenger airbag. Side panel 10 has an irregular shape; that is to say, it is not a polygon. Side panel 10 has an inflation end 12 and an opposing impact end 14. Side panel 10, as shown n FIG. 1, is a right side panel. A side panel symmetrical to (that is, a mirror image of) side panel 10 is manufactured for the left side of the airbag. A long rectangular section (not shown) is sewn to side panel 10 beginning at point 16 and continuing around the periphery of side panel 10 to point 18, and to the equivalent portion of the periphery of a symmetrical but left side panel to form a substantially closed, inflatable structure, as is well known in the art. Tethers may also be added. A hole 19 is formed in side panel 10 for the modular inflator attachment in inflation end 12. A modular inflator is an airbag inflation device and housing that are used in typical passenger side airbags to inflate the bag.

FIG. 2 illustrates a panel pattern 20 for airbag side panels according to the design of side panel 10. Panel pattern 20 shows a well-nested arrangement of right side panel patterns 22 and left side panel patterns 24; that is, the individual side patterns 22, 24, for making side panels 10 have been arranged on panel pattern 20 so that no additional side panel patterns 22, 24, will fit on pattern panel 20 regardless of further rearranging. Notwithstanding the effectiveness of the nesting arrangement as shown, because of the irregular shape of side panel 10, there will remain unused, wasted fabric, namely that arising from unused areas 26 of panel pattern 20.

FIG. 3 illustrates side panel 30 divided into two segments, a first segment 32 closer to an inflation end 34 and a second segment 36 that is closer to an impact end 38. First segment 32 has an inflation hole 33 for receiving the modular inflation attachment, similar to hole 19 in inflation end 12, above. Second segment 36 has a somewhat more polygonal shape, roughly trapezoidal, and will therefore nest better than less regular shapes. First segment 30, although still quite irregular in shape, is easier to nest than side panel 30 simply because it is smaller. Importantly, sewing first and second segments, 32, 34, together creates side panel 30, as illustrated in FIG. 4, which is substantially identical to side panel 10 in FIG. 1. The only difference between side panels 10 and 30 is seam 40. A symmetrical left side panel is created in the same way and then sewn to a long rectangular segment of air bag material to create the inflatable airbag structure as in the prior art, except for seam 40 on right side panel 30 and an equivalent seam on the symmetric left side panel.

FIG. 5 illustrates a well-nested pattern panel 50 using an equal number of first and second segment patterns 52, 54, respectively, for a right side panel like right side panel 30 as shown in FIG. 4, and first and second segment patterns 56, 58, respectively, for a left side panel that is symmetric to (mirror image of) right side panel 30.

Several aspects of panel pattern 50 are worth noting. First, although there is still unused area 60 left over, material utilization has been increase by 13%, a significant savings. Second, both first and second segment patterns 52, 54, 56, and 58, are oriented on panel pattern 50 either horizontally or vertically but not in any other orientation. This orientation assures that the bias of first segment 52, 56, will still be the same as first segments 32, which is critical. As it turns out, the orientation for second segments 54 and 58 with respect to panel pattern 50 is the same as for first segments 52, 56, and is optimal for these segments. Their major dimensions are best oriented perpendicular and parallel to the orientation of the fibers in the fabric panel made from panel pattern 50. Third, pattern panel 50 contains the same number of sets of first and second segments 52 and 54, and 56 and 58, so no unmatched segments are left over.

FIGS. 6 and 7 illustrate a different example of the present invention. An airbag side panel 70, having an inflation end 72 and an impact end 74, is shown in FIG. 6. Side panel 70 has been divided into two segments. There is a first segment 76 that includes inflation end 72, and is accordingly very irregular in shape, and a second segment 78 that is more generally polygonal in shape. By segmenting airbag side panel 70 at seam 80 for the purposes of cutting the segments separately and then sewing them together, a better nesting pattern on panel pattern 82 (FIG. 7) can be obtained. Segments 76 and 78 are smaller and thereby provide more possibilities for nesting; and segment 78 has been created so that it is generally polygonal in shape and therefore nests better because of its generally straight sides. Panel pattern 82 includes right side, first segment patterns 84; right side, second segments patterns 86; left side, first segment patterns 88; and left side, second segment patterns 90. When these pairs of segments, 84 and 86, and 88 and 90, are sewn together, right and left side panels like right side panel 70 and the mirror image of it are obtained. These right and left side panels can be formed into an inflatable airbag by attaching a long rectangular segment of airbag fabric to their peripheries, as in the prior art. The only difference in the resulting airbag is the presence of seam 80 on both side panels 70. Making the segmentation along seam 80 improves nesting, and, thereby, fabric utilization significantly, by 31%, notwithstanding unused areas 92 on pattern panel 82.

In order to obtain the improvements in fabric utilization, the user begins with any irregularly-shaped side panel of a airbag. The side panel is inspected to determine how best to segment it into two segments by one straight line into one large and one small segment with the smaller of the two including the inflation module hole. In order to prevent the seam that will be associated with the inflation hole to be weakened by the seam that joins the two segments, a reasonable separation distance should be maintained. This distance depends on a number of factors, such as the strength of the airbag material, the strength of the seam, and the inflation dynamic forces, however, a separation distance of 50 mm is a reasonable nominal distance for most airbags. There will typically be a number of straight lines that can define the inflation segment from the impact segment. However, in general, the larger the inflation segment can be and still be a polygon, the better. A polygon is a multisided, closed, plane figure wherein no two adjacent sides are at an angle greater than 180°. A triangle is a three-sided polygon; a circle is a polygon with infinitely many sides.

The larger the polygon of the impact segment, the better. The impact segment will have a major dimension and a minor dimension. Because there is no preference of the orientation of the impact segment with respect to the inflation segment, its orientation can be selected purely for reasons based on nesting. In general, if the major dimension is oriented parallel to or perpendicular to the orientation of the fabric, best nesting will be achieved. The fabric "orientation" is the direction of the warp yarns.

Although the impact segment is oriented for nesting, the inflation segments must be oriented in the range 25° to 65° and preferably close to 45° for strength. Being able to orient at least the impact segment in any direction with respect to the orientation of the fabric, gives additional flexibility in selecting nesting patterns. When the impact segment is the larger of the two, the lack of flexibility in choosing the orientation of the inflation segment is less restricting than if it were the larger segment.

The two segments are divided along a straight line. Straight seams are easier to sew and furthermore, provide a common boundary for nesting impact segments and inflation segments.

In FIG. 3, it will be clear that this straight segmenting line defines a generally trapezoidal polygon in second segment 36, for example. In FIG. 6, the straight lines also define polygons for the impact segments.

The airbag fabric is woven, coated if desired, and then cut in accordance with the pattern panel to obtain the plural first and second segments from the woven fabric. Pairs of first and second segments are joined by a seam to form each irregularly-shaped side panel. An inflatable structure, such as an airbag can then be formed using the irregularly-shaped side panel in the same manner as taught in the prior art, namely, by attaching a long rectangular piece of airbag fabric to the periphery of a left and right side panels, and then connecting tethers, if desired.

The larger the polygonal impact segment is, as a fraction of the total panel area, the better for fabric utilization. Clearly, very small impact segments will result in smaller savings and the cost of the additional labor in joining the portions together by seaming may outweigh the savings in material costs. Preferably, the polygonal impact segment has an area that is at least approximately half of the area of the side panel of which it is a part.

When the segment patterns are arranged on the pattern panel, those segment patterns are preferably arranged so that they are well-nested. Nesting generally means arranging them as close together as possible so that no other arrangement exists that includes a greater number of segment pairs. Those segment pair patterns are nested either by human or computer techniques with the following constraints. The first constraint is that the number of segments of each type must be sufficient to form whole side panels, with no unmatched segments left over.

The second criterion of nesting is that the orientation of the segments must be appropriate. In the case of side panels of passenger airbags, where stretch is important, the inflation segments must be oriented so that the direction of expansion of the airbag is between 25° and 65°, and preferably closer to 45° from the direction of the warp, to provide for stretching of the panel on inflation. Consistency of stretch is preserved between left and right side panels and between the segments of each side panel if the inflation segments are all aligned the same direction with respect to the warp of the fabric. Fortunately, of course, 45° from the direction of the warp defines four orientations for a single segment that all provide the same stretch: +45° and facing forward; −45° and facing forward; +45° and facing backward; and −45° and facing backward. As stated above, the only criterion on the orientation of the impact segments is for best nesting, which is generally obtained when the major dimensions of the impact segments are oriented parallel to or perpendicular to the warp of the fabric.

Once the segmentation process is complete and constraints on orientation of the segments with respect to the direction of the fabric warp are known, the segments can be subjected to nesting using a standard computer nesting algorithm or the skills of a human being familiar with nesting techniques.

Using standard airbag fabric manufacturing technology and pattern cutting and sewing techniques, the airbags can be fabricated from the sewn fabric segments.

Those skilled in the art of airbag design for passenger restraints will appreciate that many substitutions and modifications may be made to the preferred embodiments described herein without departing from the spirit and scope of the present invention, which is defined by the appended claims.

What is claimed is:

1. An airbag, comprising an inflatable structure made of a woven fabric, said airbag comprising a first side panel and a second side panel of substantially mirror image geometry to the first side panel, wherein each of said side panels is irregular in shape characterized by a lack of bilateral symmetry, said first and second side panels each consisting essentially of a first segment and a second segment, the first segment of the first side panel comprising a boundary edge adjoined to the second segment of the first side panel along a first seam line and the first segment of the second side panel comprising a boundary edge adjoined to the second segment of the second side panel along a second seam line such that the first segments of the first and second side panels extend away from the seam lines to define a gas inlet inflation portion of the airbag, and the second segments of the first and second side panels extend away from the seam lines to define an impact portion of the airbag, wherein the first segment of the first side panel has a fabric orientation which is different from the fabric orientation of the second segment of the first side panel and the first segment of the second side panel has a fabric orientation which Is different from the fabric orientation of the second segment of the second side panel.

2. The airbag as recited in claim 1, wherein said fabric has a warp direction, and wherein said first segment of each of said first and second panels has a fabric orientation ranging from 25° to 65° with respect to said warp direction.

3. The airbag as recited in claim 1, wherein said fabric has a warp direction, and wherein said second segment of each of said first and second panels has a fabric orientation parallel or perpendicular to said warp.

4. The airbag as recited in claim 1, wherein said first and second seam lines are substantially straight.

5. The airbag as recited in claim 1, wherein each of said second segments defines a polygon.

6. The airbag as recited in claim 1, wherein said second segment of said first side panel defines the largest polygonal shape possible in said first side panel.

7. The airbag as recited in claim 1, wherein said first segment of said first side panel has an inflation hole and said second segment of said first side panel defines the largest poygonal shape possible in said first side panel that is at least 50 mm from said inflation hole.

8. The airbag as recited in claim 1, wherein said first segment of said first side panel has an inflation hole and said second segment of said first side panel defines the largest polygonal shape possible in said first side panel that is at least 50 mm from said inflation hole that can be made with a straight line.

9. The airbag as recited in claim 1, wherein said fabric has a warp direction, and wherein said first segment of each of said first and second side panels has a fabric orientation ranging from 25° to 65° with respect to said warp direction and wherein said second segment of each of said first and second side panels has a fabric orientation parallel or perpendicular to said warp.

10. The airbag as recited in claim 9, wherein said first and second seam lines are substantially straight.

* * * * *